United States Patent
Haley et al.

(10) Patent No.: US 7,529,851 B1
(45) Date of Patent: May 5, 2009

(54) METHOD AND APPARATUS FOR MAC ADDRESS ASSIGNMENT

(75) Inventors: Graham Haley, Edinburgh (GB); Neil Jarvis, Edinburgh (GB)

(73) Assignee: Cisco Technology, Inc., San Jose, CA (US)

( * ) Notice: Subject to any disclaimer, the term of this patent is extended or adjusted under 35 U.S.C. 154(b) by 1275 days.

(21) Appl. No.: 10/072,097

(22) Filed: Feb. 8, 2002

(51) Int. Cl.
*G06F 15/16* (2006.01)

(52) U.S. Cl. .................. 709/245; 709/220; 709/224

(58) Field of Classification Search .................. 709/224, 709/220, 245
See application file for complete search history.

(56) References Cited

U.S. PATENT DOCUMENTS

| 5,732,071 A | * | 3/1998 | Saito et al. ................... 370/255 |
|---|---|---|---|
| 6,732,165 B1 | * | 5/2004 | Jennings, III ................ 709/220 |
| 6,807,184 B2 | * | 10/2004 | Gutknecht et al. .......... 370/401 |
| 2002/0073182 A1 | * | 6/2002 | Zakurdaev et al. .......... 709/220 |
| 2002/0191567 A1 | * | 12/2002 | Famolari et al. ............ 370/335 |
| 2003/0026230 A1 | * | 2/2003 | Ibanez et al. ................ 370/338 |
| 2003/0061578 A1 | * | 3/2003 | Wada ............................ 716/2 |
| 2003/0081578 A1 | * | 5/2003 | White et al. ................. 370/338 |
| 2004/0153575 A1 | * | 8/2004 | Coggeshall .................. 709/245 |
| 2004/0249975 A1 | * | 12/2004 | Tuck et al. ................... 709/245 |

* cited by examiner

*Primary Examiner*—Ario Etienne
*Assistant Examiner*—Barbara N Burgess
(74) *Attorney, Agent, or Firm*—Cesari and McKenna LLP (57) ABSTRACT

A method and apparatus for automatically assigning a locally administered MAC address to at least one client in a local area network ("LAN") system, and a method and apparatus for detecting duplicate locally administered MAC addresses, where the LAN system comprises at least one client and may comprise at least one server.

32 Claims, 7 Drawing Sheets

METHOD AND APPARATUS FOR MAC ADDRESS ASSIGNMENT

BACKGROUND OF INVENTION

1. Field of Invention

The present invention relates to the assigning of MAC addresses to clients of a local area network system.

2. The Background Art

The widespread use and acceptance of the Internet has generated much excitement, especially among those who see advantages in networking their voice, data and graphical communications.

Many individuals, businesses, schools and others use a local-area network ("LAN") as their network system or the LAN may be part of a larger network system. A LAN is a short-distance data communications network (which may be within a building or campus) used to link together computers and peripheral devices under some form of standard control.

When using a LAN, a MAC address is required. A MAC address is a standardized data link layer that is required for every port or device that connects to a LAN. Other devices in the network use these MAC addresses to locate specific ports in the network and to create and update routing tables and data structures. "MAC" stands for Media Access Control which is the lower of the two sublayers of the data link layer defined by the IEEE. The MAC sublayer handles access to shared media, such as whether token passing or contention will be used.

SUMMARY OF THE INVENTION

A method and apparatus for automatically assigning a locally administered MAC address to at least one client in a local area network ("LAN") system, and a method and apparatus for detecting duplicate locally administered MAC addresses, where the LAN system comprises at least one client and may comprise at least one server.

BRIEF DESCRIPTION OF THE DRAWINGS

The present invention is described in greater detail by referencing the accompanying drawings.

DETAILED DESCRIPTION

Those of ordinary skill in the art will realize that the following description of the present invention is illustrative only and not in any way limiting. Other embodiments of the invention will readily suggest themselves to such skilled persons.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

This disclosure may relate to any network known in the art, such as a packet or frame based network including an Ethernet and networks capable of running the TCP/IP protocol.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

The present disclosed system will automatically assign a locally administered MAC address to a port or device coupled to a LAN. These ports or devices may also be referred to as "clients". Non-limiting examples of ports and devices may be routers, personal computers, printers, faxes, and file servers. The presently disclosed system may be comprised of algorithm residing in a LAN client and if there is a LAN server present, an algorithm residing in the LAN server.

The invention relates to the assignment and/or detection of locally administered MAC addresses. Most devices which connect to a LAN have a built in MAC address which is meant to be globally unique. However, there is a large range of addresses which are specifically meant to be locally administered, e.g. they can be assigned for use on a LAN by a local administrator. This makes them especially useful for protocol developers who require a range of MAC addresses for their protocol (e.g. the same address range would be used on every LAN on which the protocol is implemented). One possible problem is that there is no way to guarantee that the addresses chosen are unique within the LAN. MAC addresses have to be unique on a given LAN for proper communication at the datalink layer.

Locally administered MAC addresses look exactly the same as normal MAC addresses with the exception that bit 2 of the first byte of the MAC address is set to 1. This gives a range of addresses which are 2 to the power of 46 in size. The disclosed system may be used with or without a server on the network.

Figure 1A:
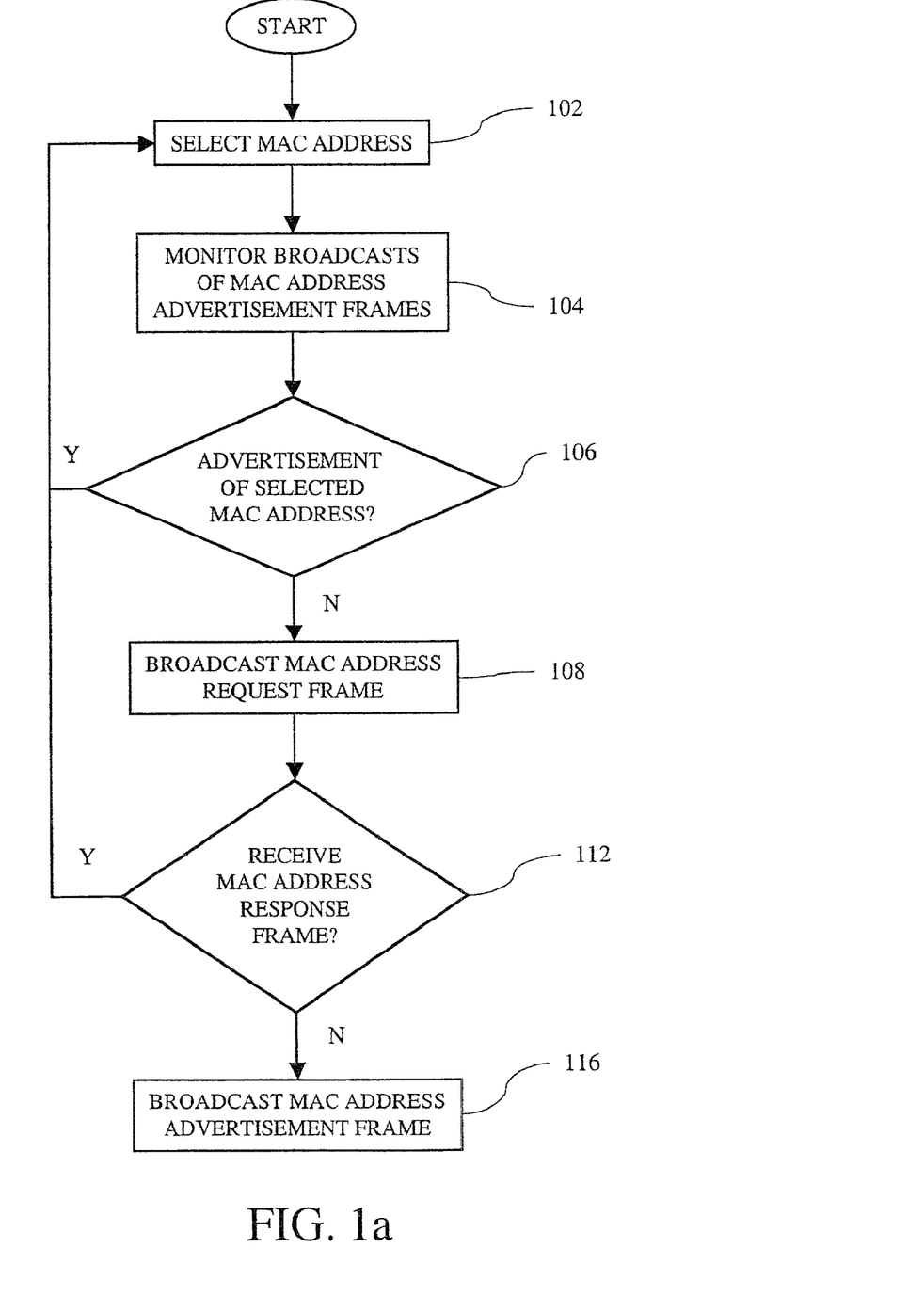
FIG. 1a is a flowchart of one embodiment of the disclosed method, showing the client-side method.

Referring to FIG. 1a, one embodiment of the disclosed method is shown. FIG. 1a shows the client-side of the disclosed method. The client selects a MAC address at act 102 that it will request at a later act. The term "MAC address" may refer to both a single MAC address and to a range of MAC addresses. At act 104 the client monitors for broadcast frames advertising the use of the selected MAC address. A "frame" is a logical grouping of information sent as a data link layer unit over a transmission medium. At query 106, the client determines whether any of the monitored advertisement frames were the same as the selected MAC address. If the client determines that none of the advertisement frames it monitored were of the same MAC address, then the client broadcasts a MAC address request frame at act 108. The client determines whether it has received a MAC address response frame from a server on the LAN at query 112. If no server confirms the availability of the MAC address, the client then broadcasts a MAC address advertisement frame at act 116. One reason for act 116, is that it allows the client to assume that it has its requested MAC address, even if there is not a server on the LAN.

Figure 1B:
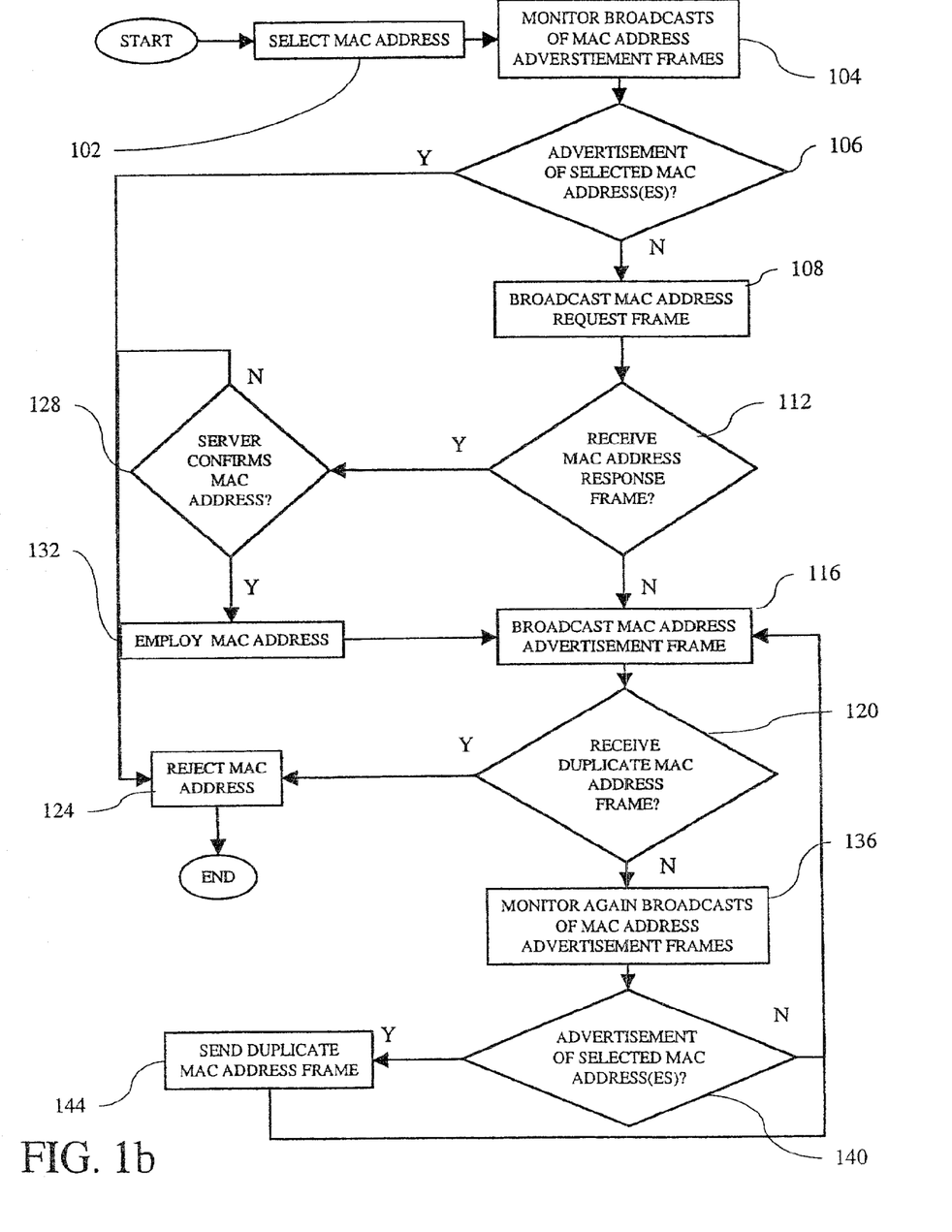
FIG. 1b is another flowchart of one embodiment of the disclosed method, showing the client-side method.

Referring to FIG. 1*b*, another embodiment of the disclosed system is shown. FIG. 1*b* also shows the client side of the disclosed system. The client selects a MAC address at act 102 that it will request at a later act. At act 104 the client monitors for broadcast frames advertising the use of the selected MAC address. At query 106, the client determines whether any of the monitored advertisement frames were of the selected MAC address. If the client determines that none of the advertisement frames it monitored were of the same MAC address, then the client broadcasts a MAC address request frame at act 108. The client determines whether it has received a MAC address response frame from a server on the LAN at query 112. If the client has not received a MAC address response frame, then the client, at act 116, broadcasts a MAC address advertisement frame wherein it advertises that it is using the MAC address requested at act 108. If the client does receive a MAC address response frame, then the client, at query 128, determines whether the server(s) sending the MAC address response frame are confirming the MAC address request frame (verifying that the MAC address is available according to the server) or not confirming the MAC address request frame (indicating that the MAC address requested is already being used). If at least one server confirms the availability of the MAC address, the client then employs the MAC address for use at act 132. Then the client proceeds to act 116. If the client determines that none of the servers are confirming the availability of the MAC address, the method can simply end in this embodiment. However, in other embodiments of the disclosed system shown below, other acts may comprise the method if the client determines that no server is confirming the MAC address.

In a simple case, a client (computer or otherwise) will broadcast an address request frame. If no response is received within a given time period, the client will assume that it is OK to use the address requested and will start periodically broadcasting the fact that these addresses are in use. This allows other clients to detect whether the addresses they would like to use are in use or are free.

If another client is using the same MAC address that is being broadcast in the MAC address advertisement frame from act 116, then that client will respond to that broadcast by sending a duplicate MAC address frame, notifying the system that that MAC address has already been assigned. Thus, at query 120, the client determines whether it has received a duplicate MAC address frame from any other clients. If the client has received a duplicate MAC address frame, then at act 124, the client will reject the MAC address.

If no duplicate MAC address frames are received, then the method proceeds to act 136 where the client monitors again broadcasts of MAC address advertisement frames from other clients. This act is described as "monitors again . . . " to differentiate this act from act 104. At act 140, the client determines whether any broadcast MAC address advertisement frames are advertising any MAC addresses used by the client, if so, the client will send a duplicate MAC address frame informing the client that is broadcasting a MAC address advertisement frame, that it is already using the MAC address at act 144.

Figure 2:
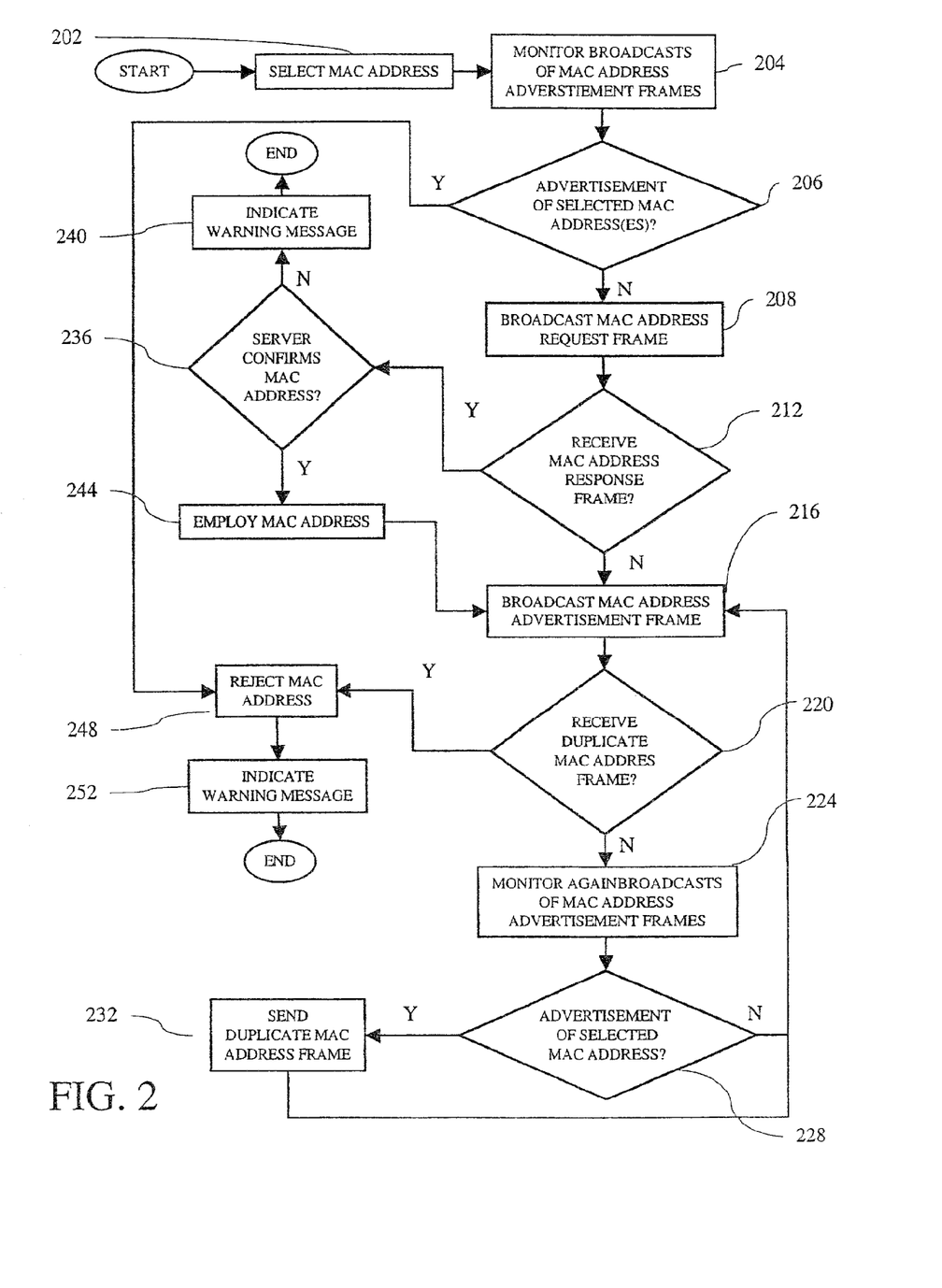
FIG. 2 is another flowchart of one embodiment of the disclosed method, showing the client-side method.

Referring to FIG. 2, another embodiment of the client-side system is shown. The client selects a MAC address at act 202 that it will request at a later act. At act 204 the client monitors for broadcast frames advertising the use of the selected MAC address. At query 206, the client determines whether any of the monitored advertisement frames were of the selected MAC address. If the client determines that none of the advertisement frames it monitored were of the same MAC address, then the client broadcasts a MAC address request frame at act 208. The client determines whether it has received a MAC address response frame from a server on the LAN at query 212. If the client has not received a MAC address response frame, then the client, at act 216, broadcasts a MAC address advertisement frame wherein it advertises that it is using the requested MAC address requested at act 208. If the client does receive a MAC address response frame, then the client, at query 236, determines whether the server(s) sending the MAC address response frame are confirming the MAC address request frame (verifying that the MAC address is available according to the server) or not confirming the MAC address request frame (indicating that the MAC address requested are already being used). If at least one server confirms the availability of the MAC address, the client then employs the MAC address at act 244. Then the client proceeds to act 216. If the client determines that none of the servers are confirming the availability of the MAC address, the client can indicate a warning message that it does not have a MAC address at act 240. One non-limiting example of indicating a warning message is for the client to display a warning message on a console screen.

If another client is using the same MAC address that is being broadcast in the MAC address advertisement from act 216, that client will respond by sending a duplicate MAC address frame, notifying the system that that MAC address has already been assigned. Thus, at query 220, the client determines whether it has received a duplicate MAC address frame from any other clients. If no duplicate MAC address frames are received, then the method proceeds to act 224. If a duplicate MAC address frame is received, the client can reject the MAC address it previously requested at act 248. Then, the client may send a warning message indicating that it does not have a MAC address at act 252.

At act 224 the client monitors again broadcasts of MAC address advertisement frames from other clients. This act is described as "monitors again . . . " to differentiate this act from act 204. At query 228, the client determines whether any MAC address advertisements are advertising any MAC addresses used by the client, if so, the client will send a duplicate MAC address frame informing the system that it is already using the MAC address at act 232.

Figure 3:
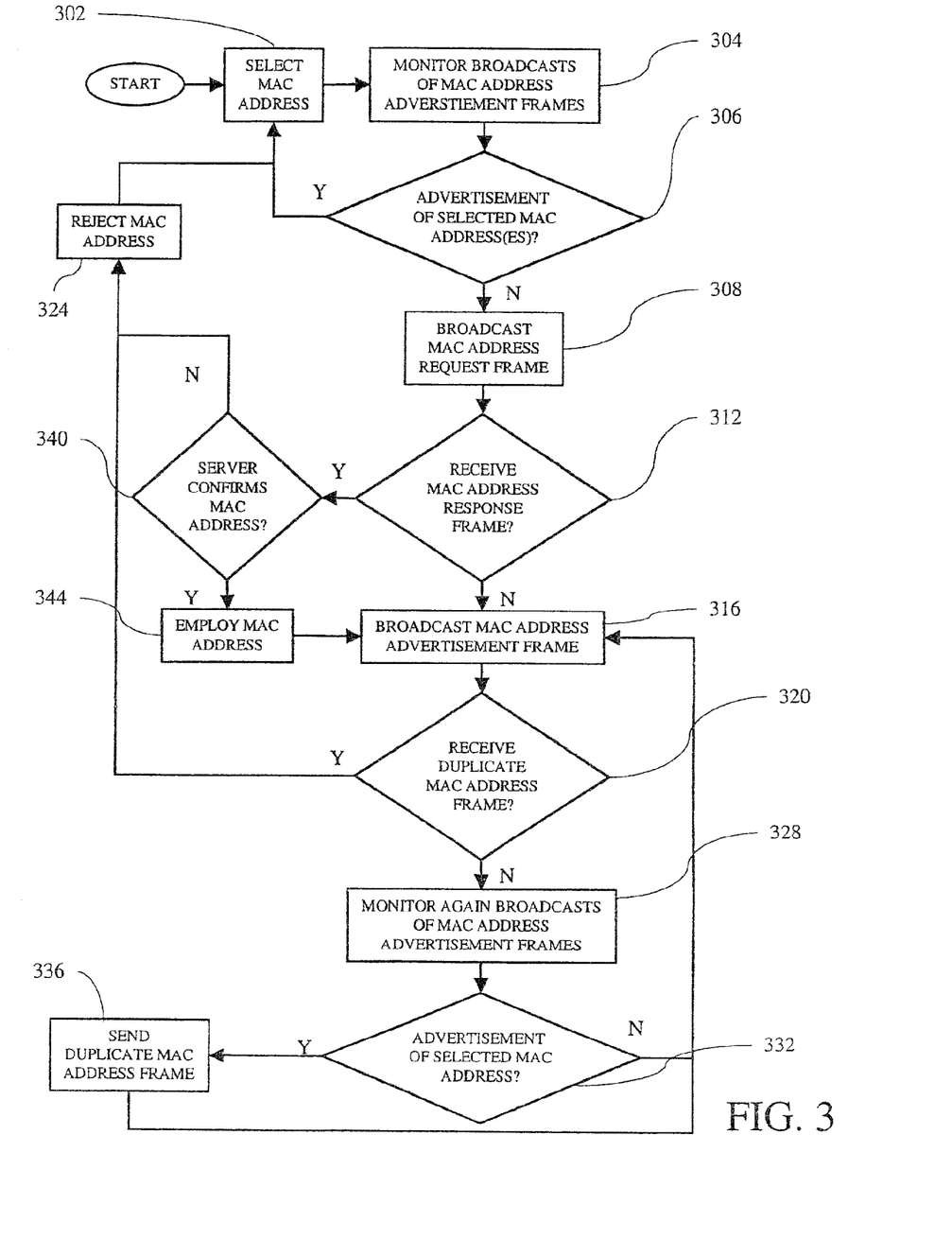
FIG. 3 is another flowchart of one embodiment of the disclosed method, showing the client-side method.

Referring to FIG. 3, another embodiment of the client side system is shown. The client selects a MAC address at act 302 that it will request at a later act. At act 304 the client monitors for broadcast frames advertising the use of the selected MAC address. At query 306, the client determines whether any of the monitored advertisement frames were of the selected MAC address. If the client determines that none of the advertisement frames it monitored were of the same MAC address, then the client broadcasts a MAC address request frame at act 308. However, if the client determines that there was an advertisement frame of the selected MAC address, the client may return to act 302, and select a different MAC address. The client determines whether it has received a MAC address response frame from a server on the LAN at query 312. If it the client has not received a MAC address response frame, then client, at act 316, broadcasts a MAC address advertisement frame wherein it advertises that it is using the requested MAC address requested at act 308. If the client does receive a MAC address response frame, then the client, at query 340, determines whether the server(s) sending the MAC address response frame are confirming the MAC address request frame (verifying the MAC address is available according to the server) or not confirming the MAC address request frame (indicating that the MAC address requested are already being used). If at least one server confirms the availability of the MAC address, the client then employs the MAC address at act 344. Then the client proceeds to act 316. If the client determines that none of the servers are confirming the availability of the MAC address, the client may return to act 302, where it may select a different MAC address. The method then proceeds to query 304.

If another client is using the same MAC address that is being broadcast in the MAC address advertisement from act 316, that client will respond by sending a duplicate MAC address frame, notifying the system that that MAC address has already been assigned. Thus, at query 320, the client determines whether it has received a duplicate MAC address frame from any other clients. If no duplicate MAC address frames are received, then the method proceeds to act 328. If a duplicate MAC address frame is received, the client can reject the MAC address it previously requested at act 324, then return to act 302 where it selects a different MAC address.

At act 328 the client monitors again broadcasts of MAC address advertisement frames from other clients. This act is described as "monitors again . . . " to differentiate act 328 from act 304. At query 332, the client determines whether any MAC address advertisements are advertising any MAC addresses used by the client, if so, the client will send a duplicate MAC address frame informing the system that it is already using the MAC address at act 336.

Figure 4A:
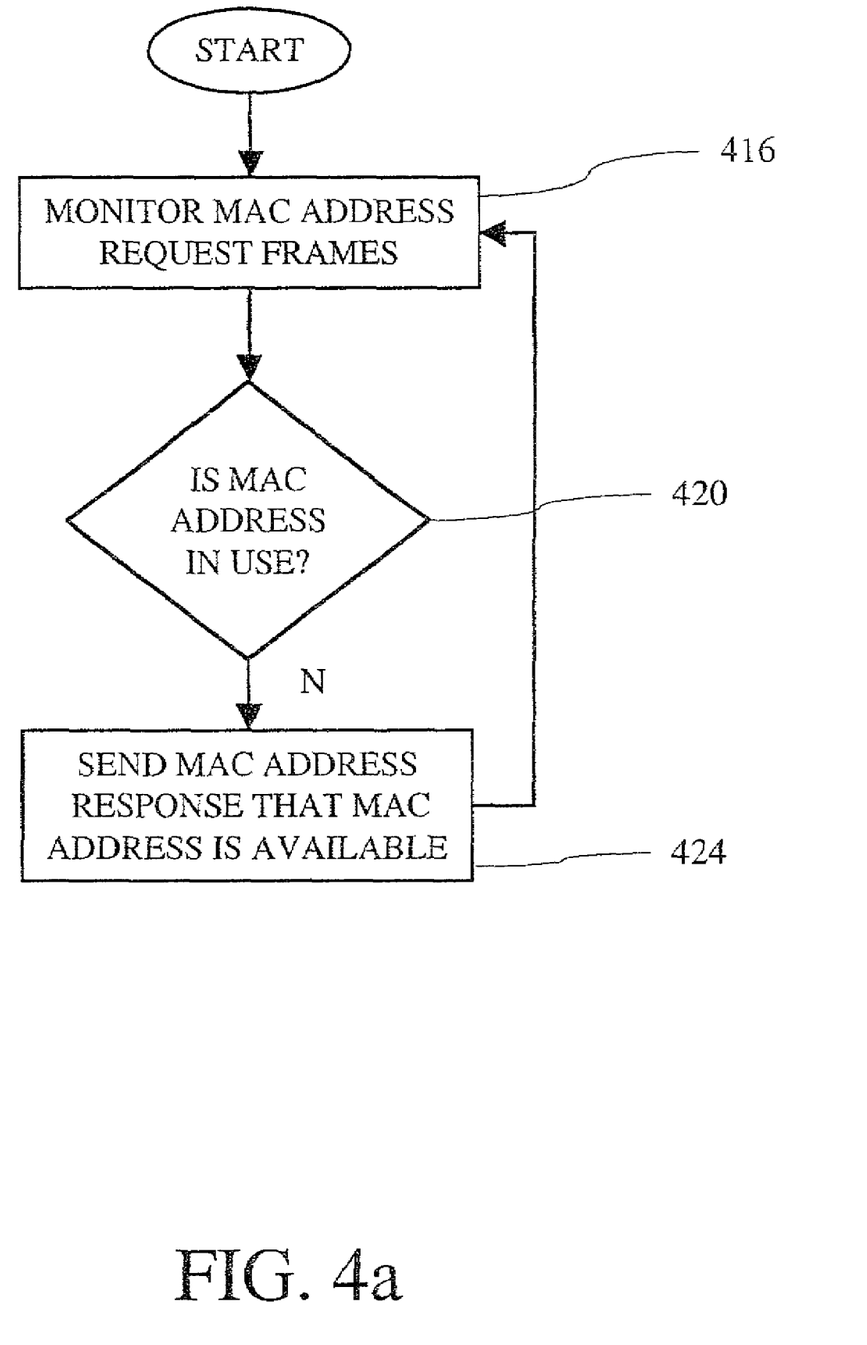
FIG. 4a is a flowchart of one embodiment of the disclosed method, showing the server-side method.

If the LAN has a server, then referring to FIG. 4a, another embodiment of the disclosed system is shown. In FIG. 4a the server side of the system is shown. At act 416, the server monitors for MAC address request frames from clients. When the server detects a MAC address request frame, it determines whether the requested MAC address is in use at query 420. If the MAC address is not in use, the server sends a MAC address response that the MAC address is available at act 424.

Figure 4B:
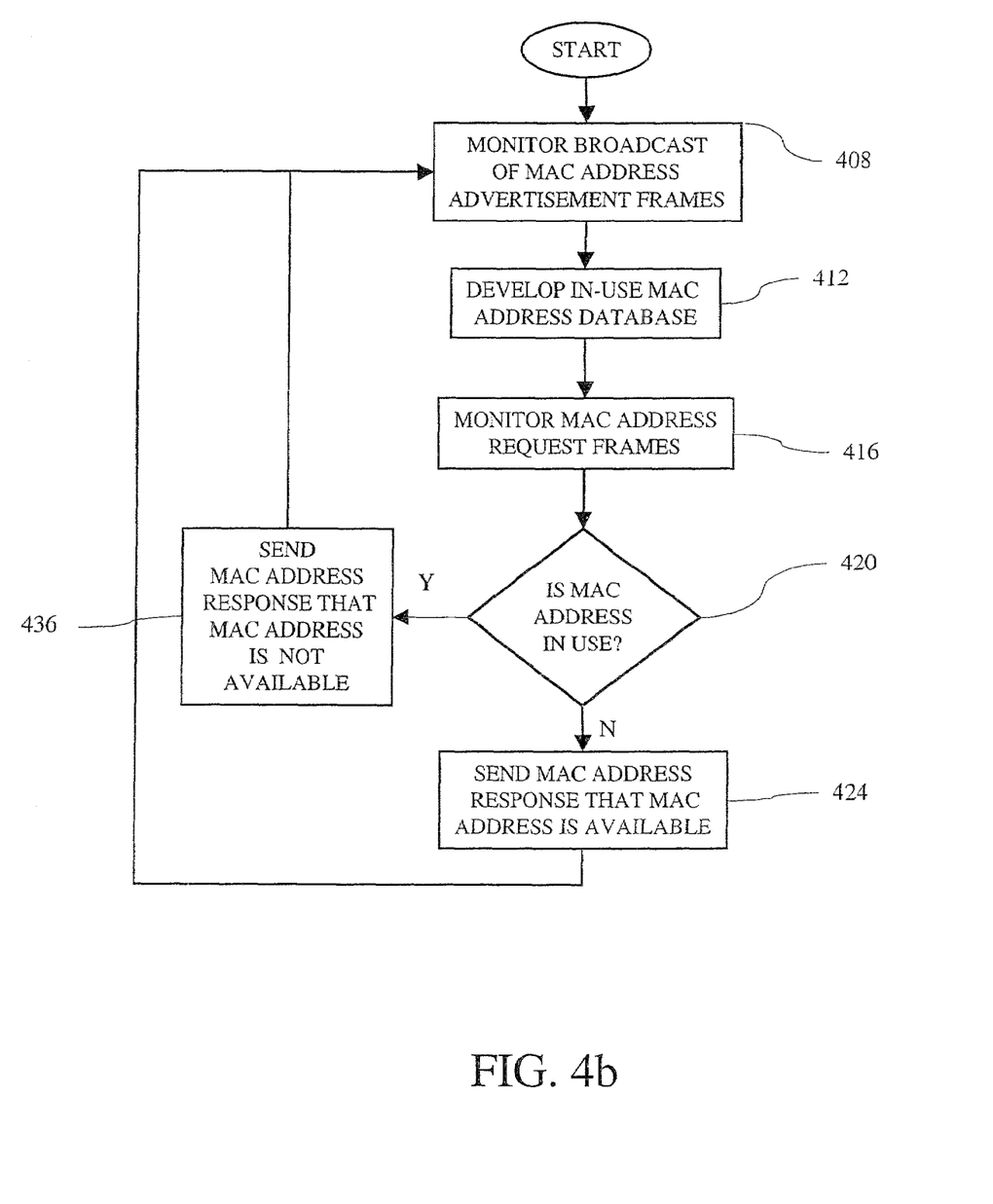
FIG. 4b is another flowchart of one embodiment of the disclosed method, showing the server-side method.

Referring to FIG. 4b, another embodiment of the disclosed system is shown if the LAN has a server. In FIG. 4b the server side of the system is shown. The server monitors the broadcast of MAC address advertisement frames at act 408. Based on the information received at act 408, the server builds an "in-use" MAC address database, where it keeps track of those MAC addresses which have been advertised as being in use at act 412. At act 416, the server monitors for MAC address request frames from clients. When the server detects a MAC address request frame, it determines whether the requested MAC address is in use by comparing the requested MAC address to the in-use MAC address database it has developed at query 420. If the MAC address is in use by another client, then the server sends a MAC address response that the MAC address is not available at act 436. If the MAC address is not in use, the server sends a MAC address response that the MAC address is available at act 424.

Figure 5:
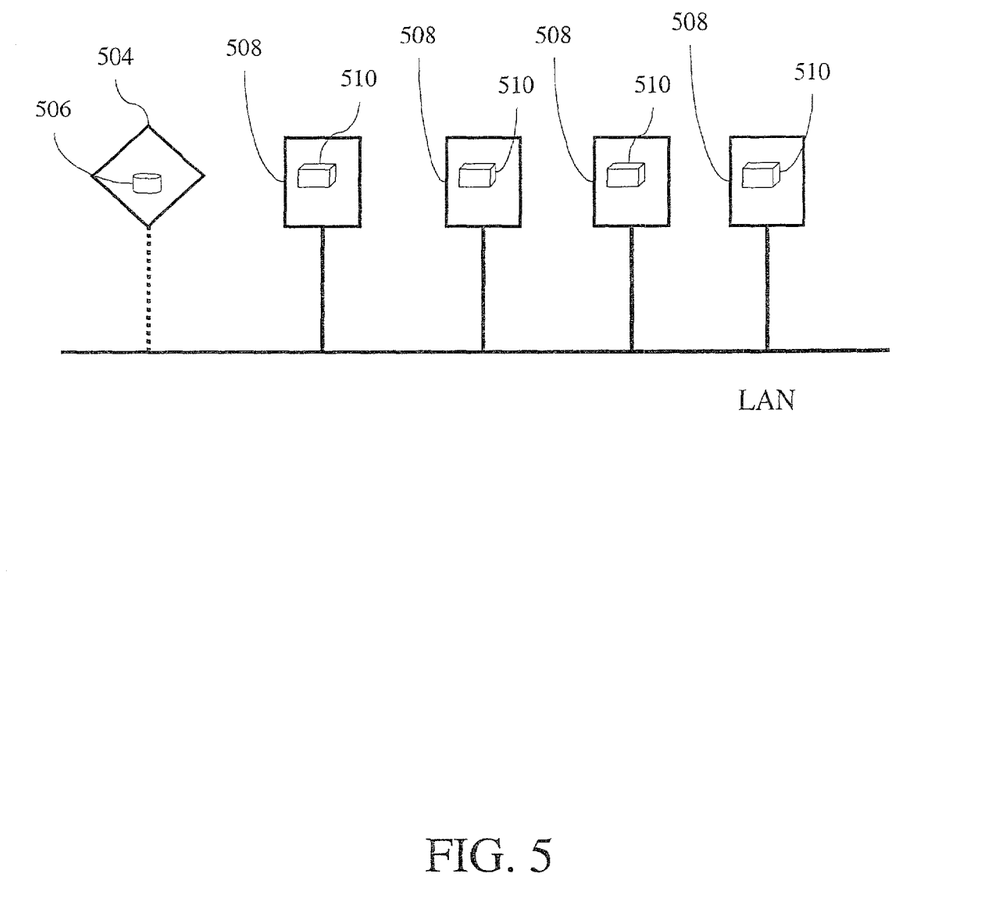
FIG. 5 is a schematic of one embodiment of the disclosed apparatus.

Referring to FIG. 5, a schematic of an example LAN is shown with the disclosed system. A server 504 is shown coupled to the LAN by a dotted line, which indicates that this LAN may or may not have a server. Disposed within the server is the server-side algorithm or method 506 disclosed in this application. Various clients 508 are shown coupled to the LAN. Disposed within each client 508 is the disclosed client-side algorithm or method 510.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a local area network ("LAN") system comprising at least one client, a method performed by a client to receive a MAC address for said network comprises:
   selecting, by said client, a MAC address available for said network;
   monitoring, by said client, broadcasts over said network for each MAC address advertisement frame transmitted over said network responsive to selecting said MAC address;
   determining whether each said advertisement frame monitored by said client is an advertisement frame for said selected MAC address;
   broadcasting a MAC address request frame by said client wherein said MAC address request is requesting said selected MAC address, responsive to a determination that each said MAC advertisement frame monitored is not an advertisement frame for said selected MAC address;
   determining whether a MAC address response frame was received by said client responsive to broadcasting said MAC address request frame; and
   broadcasting a MAC address advertisement frame from said client wherein said MAC address advertisement frame is for said selected address indicating said client is using said selected address if no MAC address response frame was received.

2. The method of claim 1, wherein said method further comprises:
   receiving a MAC advertisement frame by said client;
   determining whether said MAC address advertisement frame for said selected address was received by said client;
   sending a duplicate MAC address frame from said client, responsive to a determination that said MAC address advertisement frame is for said selected MAC address; and
   returning to the act of broadcasting MAC address advertisement frames for said selected address from said client.

3. The method of claim 2, wherein said method further comprises:
   receiving a MAC address response frame from a server by said client;
   determining whether said server confirms the availability of said selected MAC address for said client responsive to said MAC address response frame being received;
   employing said MAC address for said client; and
   proceeding to said act of broadcasting said MAC address advertisement frame for said selected address from said client.

4. The method of claim 2, wherein said method further comprises rejecting said selected MAC address by said client if a duplicate MAC address frame was received.

5. The method of claim 2, wherein said method further comprises indicating a warning message by said client if no server confirms the availability of said selected MAC address.

6. The method of claim 2, wherein said method further comprises indicating a warning message by said client if a duplicate MAC address frame is received.

7. The method of claim 2, wherein said method further comprises:
   returning to the act of selecting a MAC address by said client if no server confirms the availability of the selected MAC address.

8. The method of claim 2, wherein said method further comprises:
    returning to the act of selecting a MAC address by said client if a duplicate MAC address frame was received for the selected MAC address.

9. A network device comprising a client, wherein said client comprises a processor and a memory; wherein said memory contains a program which when executed causes the processor to perform the acts comprising:
    selecting, by said client, a MAC address available for said network;
    monitoring, by said client, broadcasts over said network for each MAC address advertisement frame transmitted over said network responsive to selecting said MAC address;
    determining whether each said advertisement frame monitored by said client is an advertisement frame for said selected MAC address;
    broadcasting a MAC address request frame from said client requesting said selected MAC address responsive to a determination that each said MAC advertisement frame monitored is not an advertisement frame for said selected MAC address;
    determining whether a MAC address response frame was received by said client responsive to broadcasting said MAC address request frame; and
    broadcasting a MAC address advertisement frame from said client for said selected address indicating said client is using said selected address if no MAC address response frame was received.

10. The network device of claim 9, wherein said program further comprises the acts of:
    receiving a MAC advertisement frame by said client;
    determining whether said MAC address advertisement frame for said selected address was received by said client;
    sending a duplicate MAC address frame from said client, responsive to a determination that said MAC address advertisement frame of is for said selected MAC address; and
    returning to the act of broadcasting MAC address advertisement frames for said selected address from said client.

11. The network device of claim 10, wherein said program further comprises the acts of:
    receiving a MAC address response frame from a server in said client;
    determining whether said server confirms the availability of said selected MAC address of said client responsive to said MAC address response frame being received;
    employing said MAC address by said client; and
    proceeding to said act of broadcasting said MAC address advertisement frame for said selected address from said client.

12. The network device of claim 10, wherein said program further comprises the act of rejecting said selected MAC address by said client if a duplicate MAC address frame was received.

13. The network device of claim 10, wherein said program further comprises the act of indicating a warning message by said client if no server confirms the availability of said selected MAC address.

14. The network device of claim 10, wherein said program further comprises the act of indicating a warning message in said client if a duplicate MAC address frame is received.

15. The network device of claim 10, wherein said program further comprises the act of returning to the act of selecting a MAC address by said server if no server confirms the availability of the selected MAC address.

16. The network device of claim 10, wherein said program further comprises the act of returning to the act of selecting a MAC address by said client if a duplicate MAC address frame was received for the selected MAC address.

17. A network device comprising at least one client, wherein each of said at least one client comprises:
    means in said client for selecting a MAC address available for said network;
    means in said client for monitoring broadcasts over said network for each MAC address advertisement frame transmitted over said network responsive to selecting said MAC address;
    means in said client for determining whether each said advertisement frame monitored is an advertisement frame for said selected MAC address;
    means in said client for broadcasting a MAC address request frame requesting said selected MAC address responsive to a determination that each said MAC advertisement frame monitored is not an advertisement frame for said selected MAC address;
    means in said client for determining whether a MAC address response frame was received responsive to broadcasting said MAC address request frame; and
    means in said client for broadcasting a MAC address advertisement frame for said selected address indicating said client is using said selected address if no MAC address response frame was received.

18. The network device of claim 17, wherein each of said at least one client further comprises:
    means in said client for receiving a MAC advertisement frame;
    means in said client for determining whether said MAC address advertisement frame for said selected address was received;
    means in said client for sending a duplicate MAC address frame, responsive to a determination that said MAC address advertisement frame is for said selected MAC address; and
    means in said client for returning to the act of broadcasting MAC address advertisement frames for said selected address.

19. The network device of claim 18, wherein each of said at least one client further comprises:
    means in said client for receiving a MAC address response frame from a server
    means in said client for determining whether said server confirms the availability of said selected MAC address responsive to said MAC address response frame being received; and
    means in said client for proceeding to said act of broadcasting said MAC address advertisement frame for said selected address.

20. The network device of claim 18, wherein each of said at least one client further comprises means in said client for rejecting said selected MAC address if a duplicate MAC address frame was received.

21. The network device of claim 18, wherein each of said at least one client further comprises means in said client for indicating a warning message if no server confirms the availability of said selected MAC address.

22. The network device of claim 18, wherein each of said at least one client further comprises means in said client for indicating a warning message if a duplicate MAC address frame is received.

23. The network device of claim 18, wherein each of said at least one client further comprises means in said client for returning to the act of selecting a MAC address if no server confirms the availability of the selected MAC address.

24. The network device of claim 18, wherein each of said at least one client further comprises a means in said client for returning to the act of selecting a MAC address if a duplicate MAC address frame was received for the selected MAC address.

25. A program storage device readable by a machine, tangibly embodying a program of instructions executable by the machine to perform a method for receiving a MAC address, for said network, said method comprising:

selecting a MAC address available in said client for said network;

monitoring broadcasts over said network by said client for each MAC address advertisement frame transmitted over said network responsive to selecting said MAC address;

determining whether each said advertisement frame monitored by said client is an advertisement frame for said selected MAC address;

broadcasting a MAC address request frame from said client requesting said selected MAC address, responsive to a determination that each said MAC advertisement frame monitored is not an advertisement frame for said selected MAC address;

determining whether a MAC address response frame was received by said client responsive to broadcasting said MAC address request frame; and broadcasting a MAC address advertisement frame from said client for said selected address indicating said client is using said selected address if no MAC address response frame was received.

26. The method of claim 25, wherein said method further comprises:

receiving a MAC advertisement frame in said client determining whether said MAC address advertisement frame for said selected address was received by said client;

sending a duplicate MAC address frame from said client, responsive to a determination that said MAC address advertisement frame of is for said selected MAC address; and returning to the act of broadcasting MAC address advertisement frames for said selected address.

27. The method of claim 26, wherein said client-side method further comprises:

receiving a MAC address response frame from a server in said client;

determining whether said server confirms the availability of said selected MAC address responsive to said MAC address response frame being received by said client;

employing said MAC address for said client; and proceeding to said act of broadcasting said MAC address advertisement frame for said selected address from said client.

28. The method of claim 26, wherein said method further comprises rejecting said selected MAC address by said client if a duplicate MAC address frame was received.

29. The method of claim 26, wherein said method further comprises indicating a warning message from said client if no server confirms the availability of said selected MAC address.

30. The method of claim 26, wherein said method further comprises indicating a warning message from said client if a duplicate MAC address frame is received.

31. The method of claim 26, wherein said method further comprises:

returning to the act of selecting a MAC address by said client if no server confirms the availability of the selected MAC address.

32. The method of claim 26, wherein said method further comprises:

returning to the act of selecting a MAC address by said client if a duplicate MAC address frame was received for the selected MAC address.

* * * * *